ized Patent [19]

Sollner et al.

[11] 4,141,886
[45] Feb. 27, 1979

[54] ESSENTIALLY LINEAR POLYMER HAVING A PLURALITY OF AMIDE, IMIDE, AND ESTER GROUPS THEREIN AND A METHOD OF MAKING THE SAME

[75] Inventors: George H. Sollner, Fort Wayne; Keith D. Bultemeier, Decatur; Richard D. Remaks, Fort Wayne, all of Ind.

[73] Assignee: Phelps Dodge Industries, Inc., New York, N.Y.

[21] Appl. No.: 713,442

[22] Filed: Aug. 11, 1976

[51] Int. Cl.$^2$ .................. C08G 73/10; C08G 73/16
[52] U.S. Cl. .................................. 528/273; 428/458; 528/220
[58] Field of Search ............ 260/47 CP, 65, 75 N, 260/75 UA, 78 UA, 47 UA, 78 TF

[56] References Cited

U.S. PATENT DOCUMENTS

| | | | |
|---|---|---|---|
| 3,793,250 | 2/1974 | Schmidt et al. | 260/75 N |
| 3,865,785 | 2/1975 | Pauze | 260/75 N |
| 3,922,252 | 11/1975 | Holub et al. | 260/75 N |
| 3,994,863 | 11/1976 | Kovacs et al. | 260/75 N |

Primary Examiner—Lester L. Lee

[57] ABSTRACT

An essentially linear polymer having a plurality of amide, imide and ester groups therein, which is the condensation product of (1) at least one polycarboxylic acid five member ring forming reactant, (2) at least one ethylenically unsaturated polycarboxylic acid five or six member lactam ring forming reactant, (3) at least one polyfunctional amino five or six member ring forming reactant, (4) at least one glycol, (5) at least one other polyfunctional hydroxyl compound, and (6) at least one other carboxylic acid ester reactant chosen from the group consisting of the acids, esters, anhydrides, and akylesters of terephthalic, isophthalic, and benzophenone dicarboxylic acids. The molar ratio of the functional hydroxyl groups of said glycol and hydroxyl compound to the functional ester forming carboxyl groups of said acid reactants is greater than about 1.3 to 1. The molar ratio of the functional imide-forming groups of said polycarboxylic acid five member ring forming reactant and said polyfunctional amino reactant to the functional lactam-forming groups of said ethylenically unsaturated acid reactant and said polyfunctional amino reactant are greater than about 0.5 to 1 and less than about 3.0 to 1. The molar ratio of said functional ester forming carboxyl groups to said functional imide-forming and lactam-forming groups are greater than about 1.0 to 1 and less than about 3.0 to 1. The method of forming said polymer includes placing the reactants in a solvent of the polymer having a boiling point in excess of about 150° C. such as cresylic acid, heating the reactants and solvent at atmospheric pressure from about 120° C. to about 220° C., adding a suitable condensation catalyst after a reaction commences, and diluting or cooling resulting polymer solution to terminate the reaction.

15 Claims, 1 Drawing Figure

ESSENTIALLY LINEAR POLYMER HAVING A PLURALITY OF AMIDE, IMIDE, AND ESTER GROUPS THEREIN AND A METHOD OF MAKING THE SAME

BACKGROUND OF THE INVENTION

This invention relates to a novel polymer, and to a method of making the same. More particularly, the invention relates to the class of polymers which have a plurality of amide, imide and ester groups therein and are soluble in cresylic acid. Additionally, and more particularly, the invention relates to magnet wire enamels, inasmuch as the novel polymer of the invention has all of the physical, mechanical, chemical and electrical properties of a good magnet wire insulation material.

Essentially linear polyester polymers materials have long been available. Such materials have heretofore been used as magnet wire insulation materials. Both thermoplastic and thermosettable essential linear polyester resin materials have been heretofore proposed. See for example:

| | |
|---|---|
| British Patent No. 978,717 | U.S. Pat. No. 3,293,248 |
| British Patent No. 1,115,919 | U.S. Pat. No. 3,297,785 |
| Canadian Patent No. 706,940 | U.S. Pat. No. 3,312,573 |
| Canadian Patent No. 781,993 | U.S. Pat. No. 3,342,780 |
| French Patent No. 1,416,443 | U.S. Pat. No. 3,390,131 |
| U.S. Pat. No. 2,268,586 | U.S. Pat. No. 3,428,426 |
| U.S. Pat. No. 2,333,639 | U.S. Pat. No. 3,445,477 |
| U.S. Pat. No. 2,686,739 | U.S. Pat. No. 3,446,758 |
| U.S. Pat. No. 2,691,006 | U.S. Pat. No. 3,448,089 |
| U.S. Pat. No. 2,889,304 | U.S. Pat. No. 3,480,589 |
| U.S. Pat. No. 2,936,296 | U.S. Pat. No. 3,489,696 |
| U.S. Pat. No. 3,022,200 | U.S. Pat. No. 3,518,219 |
| U.S. Pat. No. 3,141,859 | U.S. Pat. No. 3,518,230 |
| U.S. Pat. No. 3,179,634 | U.S. Pat. No. 3,553,215 |
| U.S. Pat. No. 3,201,276 | U.S. Pat. No. 3,576,774 |
| U.S. Pat. No. 3,211,585 | U.S. Pat. No. 3,578,639 |
| U.S. Pat. No. 3,240,626 | U.S. Pat. No. 3,699,082 |
| U.S. Pat. No. 3,249,578 | U.S. Pat. No. 3,790,530 |

Numerous polyamide polymers, polyamide-imide polymers and polyimide polymers have also been proposed. These polymers generally have better thermal properties than the polyester polymers, but are appreciably more expensive than the polyester polymers. Thus, while these polymers also have been used as magnet wire enamels, their use has been limited to applications which can tolerate the increased cost thereof. Such polymers have also been disclosed; see for example:

| | |
|---|---|
| British Patent No. 570,858 | U.S. Pat. No. 3,347,828 |
| British Patent No. 627,205 | U.S. Pat. No. 3,445,477 |
| British Patent No. 810,489 | U.S. Pat. No. 3,451,848 |
| British Patent No. 1,009,956 | U.S. Pat. No. 3,471,444 |
| British Patent No. 1,060,159 | U.S. Pat. No. 3,472,815 |
| British Patent No. 1,155,230 | U.S. Pat. No. 3,475,212 |
| British Patent No. 1,160,097 | U.S. Pat. No. 3,485,796 |
| British Patent No. 1,168,978 | U.S. Pat. No. 3,489,696 |
| British Patent No. 1,171,242 | U.S. Pat. No. 3,493,540 |
| British Patent No. 1,175,555 | U.S. Pat. No. 3,509,106 |
| British Patent No. 1,217,041 | U.S. Pat. No. 3,518,219 |
| British Patent No. 1,220,590 | U.S. Pat. No. 3,518,230 |
| British Patent No. 1,234,252 | U.S. Pat. No. 3,539,537 |
| Canadian Patent No. 701,460 | U.S. Pat. No. 3,541,038 |
| French Patent No. 1,473,600 | U.S. Pat. No. 3,546,152 |
| U.S. Pat. No. 2,268,586 | U.S. Pat. No. 3,547,895 |
| U.S. Pat. No. 2,621,168 | U.S. Pat. No. 3,553,159 |
| U.S. Pat. No. 3,179,635 | U.S. Pat. No. 3,554,984 |
| U.S. Pat. No. 3,179,639 | U.S. Pat. No. 3,562,217 |
| U.S. Pat. No. 3,260,691 | U.S. Pat. No. 3,575,891 |
| U.S. Pat. No. 3,300,420 | U.S. Pat. No. 3,578,639 |
| U.S. Pat. No. 3,314,923 | U.S. Pat. No. 3,592,789 |
| | U.S. Pat. No. 3,696,077 |
| | U.S. Pat. No. 3,790,530 |

The demand for new polymers for use as magnet wire insulation materials which have higher and more reliable thermal life, while at the same time, are less expensive to manufacture and to apply than the polyamide, polyamide-imide, and polyimide polymers continues. To meet this demand, there had been proposed several modified polyamide, polyimide and polyester polymer materials. For the most part, these materials are polyamide ester resin materials, polyimide ester resin materials or polyamide-imide-ester resin materials. See for example:

| | |
|---|---|
| British Patent No. 1,242,715 | U.S. Pat. No. 3,425,866 |
| Canadian Pat. No. 771,126 | U.S. Pat. No. 3,426,098 |
| U.S. Pat. No. 2,547,113 | U.S. Pat. No. 3,428,486 |
| U.S. Pat. No. 2,626,223 | U.S. Pat. No. 3,458,480 |
| U.S. Pat. No. 2,777,830 | U.S. Pat. No. 3,493,544 |
| U.S. Pat. No. 2,821,517 | U.S. Pat. No. 3,505,272 |
| U.S. Pat. No. 3,136,738 | U.S. Pat. No. 3,551,383 |
| U.S. Pat. No. 3,255,069 | U.S. Pat. No. 3,555,113 |
| U.S. Pat. No. 3,338,743 | U.S. Pat. No. 3,578,638 |
| U.S. Pat. No. 3,354,126 | U.S. Pat. No. 3,699,082 |
| U.S. Pat. No. 3,361,593 | U.S. Pat. No. 3,793,250 |
| U.S. Pat. No. 3,390,118 | |

In general, some such materials are thermoplastic, some are thermosettable materials, some are cross-linked thermoplastic materials and some are cross-linked thermosettable materials. For the most part all such materials contain both aliphatic and aromatic groups. In general, the linear polymers have more flexibility than the nonlinear, cross-linked materials, and the totally aromatic polymers have a higher and more reliable thermal life, but are more expensive than the totally aliphatic polymers. Thus, each of the above-identified modified polyamide, polyester, and polyimide polymers represent compromises in thermal life, cost, flexibility, and other physical, mechanical, chemical and electrical properties.

In recent years, due to new and different applications of magnet wire, the demand for higher and more reliable thermal life has increased considerably. At the same time, the demand for lower costs and decreased processing times has also increased. It is therefore desirable to provide an improved magnet wire enamel having a higher more reliable thermal life, an increased resistance to thermal overloads which at the same time has all of the required mechanical, physical, chemical and electrical properties required for most major uses as insulation material, which can be applied in an economical and rapid manner. It is also desirable that such a resin substantially comprise a polymer having ester, imide, and amide groups therein since the inherent properties thereof are well known to manufacturers of insulated products. Further, it is highly desirable that such a magnet wire insulation material be made from readily available and well known starting materials, and soluble in conventional solvents such as cresylic acid.

SUMMARY OF THE INVENTION

It is therefore the primary object of this invention to provide an improved magnet wire insulation material, and a method of making the same.

Another object of this invention is to provide an improved polymer having a plurality of amide, imide, and ester groups therein, and a method of making the same.

Another object of this invention is to provide an improved polymer having a plurality of amide, imide, and ester groups therein and all of the required mechanical, physical, chemical and electrical properties required for most major uses as an insulation material, and a method of making the same.

Another object of this invention is to provide an improved polymer having a plurality of amide, imide and ester groups therein which is soluble in cresylic acid, and a method of making the same.

Another object of this invention is to provide an improved insulation material having a higher and more reliable thermal stability, and a method of making the same.

Yet another object of this invention is to provide an improved insulation material having an increased resistance to thermal overloads, and a method of making the same.

Yet another object of this invention is to provide an improved magnet wire insulation material comprising essentially a polymer having a plurality of amide, imide, and ester groups therein which can be applied to a copper or aluminum conductor in a more economical and rapid manner, and a method of making the same.

Yet another object of this invention is to provide an improved insulation material having higher and more reliable thermal stability and increased resistance to thermal loads, that can be applied in an economical and rapid manner, and a method of making the same.

A further object of this invention is to provide an improved magnet wire enamel comprising an essentially linear polymer having a plurality of amide, imide and ester groups therein which has all of the required mechanical, physical, chemical and electrical properties required for most uses of insulation materials, an improved and more reliable thermal stability, and an increased resistance to thermal overloads, and which can be applied in an economical and rapid manner, and a method of making the same.

In the broader aspects of this invention, there is provided an essentially linear polymer having a plurality of amide, imide and ester groups therein and all of the physical, mechanical, chemical and electrical properties of an insulation material comprising the condensation product of at least one polycarboxylic acid five member ring forming reactant, at least one ethylenically unsaturated polycarboxylic acid five or six member lactam ring forming reactant, at least one polyfunctional amino five or six member ring forming reactant, at least one glycol, at least one other polyfunctional hydroxyl compound, and at least one other carboxylic acid ester reactant chosen from the group consisting of the acids, esters, anhydrides, and akylesters of terephthalic, isophthalic, and benzophenone dicarboxylic acids. This polymer is made by the method of the invention of placing the above-identified reactants in a solvent of the polymer, thereby forming a reaction mixture, the solvent having a boiling point in excess of about 150° C., heating at atmospheric pressure the reaction mixture from about 120° C. to about 220° C., and adding a suitable condensation catalyst to the reaction mixture after the reaction begins, and terminating the reaction by diluting or cooling the reaction mixture.

BRIEF DESCRIPTION OF THE DRAWING

The above-mentioned and other features and objects of this invention and the manner of attaining them will become more apparent and the invention itself will be best understood by reference to the following description of an embodiment of the invention taken in conjunction with the accompanying drawing, wherein.

DESCRIPTION OF A SPECIFIC EMBODIMENT

Figure 1:
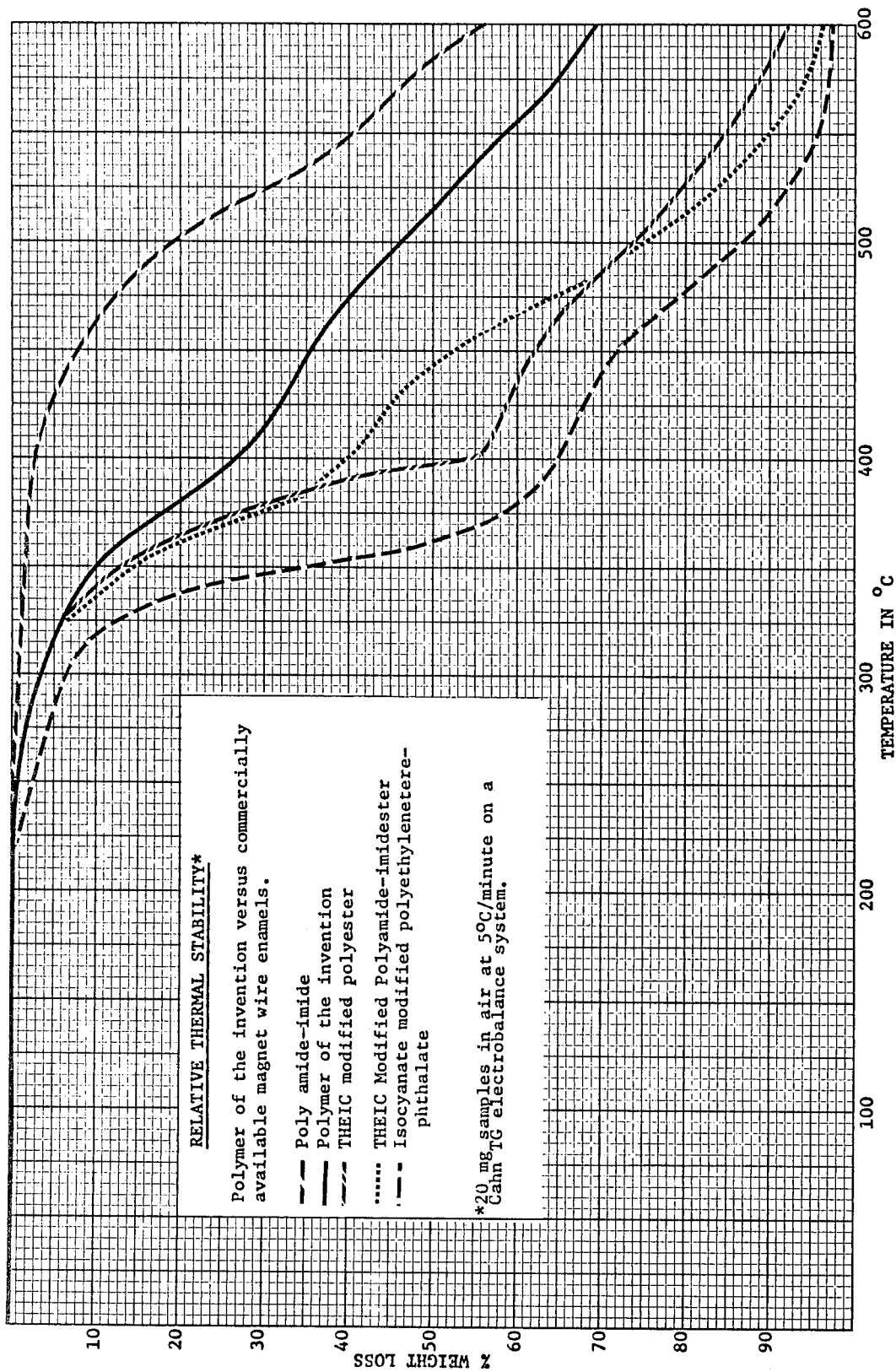
FIG. 1 is a comparison of the relative thermal stability of the polymer of the invention and prior art polymers.

The polymer of the invention is an essentially linear polymer having a plurality of amide, imide, and ester groups therein which has all of the chemical, physical and electrical properties of a good insulation material and which can be applied to both copper and aluminum conductors as magnet wire insulation in a more economical and rapid manner than prior art insulation materials having improved thermal stability characteristics and resistance to thermal overloads.

The improved polymer of the invention is essentially the condensation product of (1) at least one polycarboxylic acid five member ring forming reactant, (2) at least one ethylenically unsaturated polycarboxylic acid five or six member lactam ring forming reactant, (3) at least one polyfunctional amino five or six member ring forming reactant, (4) at least one glycol, (5) at least one other polyfunctional hydroxyl compound, and (6) at least one other carboxylic acid ester reactant chosen from the group consisting of the acids, esters, anhydrides, and akylesters of terephthalic, isophthalic, and benzophenone dicarboxylic acids. These reactants are placed in solution and reacted in the presence of a condensation catalyst in accordance with the method of the invention which will be described hereinafter.

The term "polycarboxylic acid five member ring forming reactant" is used herein to include those polycarboxylic acid reactants which when reacted with an amine, and isocyanate or other reactive functional group forms a five member imide ring. In general, these carboxylic acid reactants are those which have two adjacent carboxylic acid functional groups and their anhydrides. Both aromatic and aliphatic polycarboxylic acid reactants can be used. Examples of polycarboxylic acid five member ring reactants include: trimellitic acid; pyromellitic acid; benzophenone 2,3,2',3' tetracarboxylic acid; 2,3,6,7, naphthalene tetracarboxylic acid; 3,3',4,4' diphenyl tetracarboxylic acid; and the other known tetracarboxylic acids having two or more benzene nuclei, and the dianhydrides thereof.

The term "ethylenically unsaturated carboxylic acid five or six member lactam ring forming reactant" is used herein to refer to those unsaturated polycarboxylic acids which upon reaction with an amine will form a five or six member lactam ring. Again, both aromatic and aliphatic acids can be used, however, primarily because of their availability, aliphatic carboxylic acid reactants are preferred. Examples of such ethylenically unsaturated polycarboxylic acid five or six member lactam ring forming reactant include itaconic and aconitic acids.

The term "polyfunctional amino five or six member ring forming reactant" is used herein for those amine compounds which when reacted with a polycarboxylic acid five member ring forming reactant and an ethylenically unsaturated polycarboxylic acid five or six member lactam ring forming reactant results in the formation of a five member imide ring and a five or six member lactam ring, respectively. While any such amino compound is useful; the essentially linear diamines are preferred as will be mentioned hereinafter. Both aromatic and aliphatic amino compounds are useful in the invention. Examples of polyfunctional amino five or six member ring reactants useful in the invention include: methylene dianaline; benzidene; 3,3' diamino diphenyl; 1,4 diamino naphthalene; p-phenylene diamine; α,ω nonamethylene diamine; 4,4' diamino diphenylether; 4,4' dimethyl heptamethylene diamine; 1,7 diamino diphenyl ketone; bis(4-amino phenyl)α,α'p-xylene; m-phenylene diamine; xylene diamine; hexamethylene diamine; ethylene diamine; decacyclohexylmethane diamine; diamino diphenyl sulfone; diamino diphenyl sulfoxide; all diamines having three benzene nuclei; monoethanol amine; monopropanol amine; and the amino carboxylic acids such as glycine, amino proprionic acid, amino caproic acid, amino benzoic acid.

The terms "glycol" and "polyfunctional hydroxy compound" also are used herein for a certain class of reactants. The term "glycol" is used herein to refer to linear aliphatic diols having terminal hydroxyl groups. The term "polyfunctional hydroxyl compound" includes all glycols but further includes both aliphatic and aromatic alcohols, diols, and triols. Examples of polyfunctional hydroxyl compounds useful in the invention include: ethylene glycol; glycerin; pentaerythrytol; 1,1,1 trimethylol ethane; 1,1,1 trimethylol propane; zorbitol; manitol; dipentaerythritol; α,ω aliphatic hydrocarbon diols having four to five carbon atoms such as 1,4 butane diol; 1,5 pentane glycol; neopentylene glycol; 1,4 butene-2-diol, propylene glycol; cyclic glycols such as 2,2,4,4, tetramethyl 1,3 cyclobutane diol and tris (2 hydroxy ethyl) isocyanurate; hydroquinone dibetahydroxy ethyl ether; 1,4 cyclohexane dimethylol; polyethylene glycol, polytetramethylene oxide glycol.

The term "other carboxylic acid ester forming reactant" is used herein to refer to the acids, esters, aryl halides, and akyl esters of terephthalic, isophthalic, and benzophenone dicarboxylic acid.

It is essential that the polymer of the invention have both aromatic and aliphatic groups therein. It is however preferred that the polymer of the invention when used as an insulation material in competition with prior art polymers having ester, imide, and amide groups therein, be predominantly aromatic because of the greater thermal stability of the aromatic groups. Inasmuch as the polyfunctional hydroxyl compound and glycol reactants and the ethylenically unsaturated polycarboxylic acid five or six member lactam ring forming reactant are more readily available as aliphatic reactants, the polycarboxylic acid five member ring forming reactant, the polyfunctional amino five or six member ring forming reactant and the other carboxylic acid ester, reactant are preferred to be aromatic.

Similarly, inasmuch as the polymer of the invention when used as an insulation material is preferably essentially linear, the polyfunctional amino five or six member ring forming reactant and the polyfunctional hydroxyl compound are preferably predominantly linear. However the polymer of the invention may have a certain amount of cross-linking through the amino, hydroxyl, carboxyl or like functional groups; and, in specific embodiment, at least a portion of the polyfunctional hydroxyl compound is a compound having three or more hydroxyl groups.

Besides the linearity and the aromaticity or the lack thereof of the specific reactants used, the amounts of the various reactants used to form the polymer of the invention are critical. To achieve a polymer having the desired properties, as above mentioned, various equivalent molar ratios of the functional groups of the reactants must not be exceeded. Also, various minimum equivalent molar ratios must be exceeded. The term "equivalent molar ratio" as used herein is calculated in accordance to the following formula:

Equivalent molar ratio =

$$\frac{\text{Moles } A \times \text{functionality of } A}{\text{Moles } B \times \text{functionality of } B}$$

It should be understood that the functional groups in the foregoing reactants are the carboxyl, hydroxyl, amino, and like groups. Therefore, the dicarboxylic acid compounds, the diols and the diamines will be bifunctional, while the functionality of an alcohol having three or more hydroxyl groups will be equal to the particular number of hydroxyl groups in that compound. The carboxyl groups are divided between the "ester-forming", "imide-forming" and "lactam-forming" carboxyl-groups. Each of the reactants above-listed have one or more of these functional groups.

Again referring to the polymer of the invention, used as an insulation material, in competition with prior art polymers having ester, imide and amide groups therein, the molar ratio of the functional hydroxyl groups of the glycol and the polyfunctional hydroxyl compound to the functional ester forming carboxyl groups of the acid reactants should be greater than about 1.3 to 1, and preferably within the range of from about 1.3 to 1 to about 1.6 to 1. The polymer of the invention with a ratio below 1.3 is difficult to disolve in cresylic acid, cresylic acid being defined in Bennett's Concise, Chemical and Technical Dictionary (1947), as a mixture of ortho, meta and para cresols having a boiling range from about 185° C. to about 230° C. The solubility of the polymer in cresylic acid is an important feature of the polymer as used for magnet wire insulation. A ratio above 1.6 results in a polymer which is cross-linked more than desirable for a magnet wire insulation material; such a polymer having less than the desired flexibility.

Similarly, the polymer of the invention desirably has a molar ratio of the functional imide-forming groups of said polycarboxylic acid reactant and said polyfunctional amino reactant to the functional lactam-forming groups of the ethylenically unsaturated acid reactant and the polyfunctional amino reactant which is greater than about 0.5 to 1 and less than about 3.0 to 1. A polymer having a ratio below 0.5 to 1 has less than desirable thermal properties inasmuch as the thermal stability of the five member imide ring is diluted by the lower thermal stability of the other polymeric groups in the polymer. A polymer having a ratio above 3.0 has more plastic flow at elevated temperatures; and thus has a lower "cut through" than desired. Preferably, the polymer of the invention used as a magnet wire insulation material should have a molar ratio from about 1.1 to 1 to about 2.5 to 1.

Similarly, the equivalent molar ratio of said functional ester forming carboxyl groups of said acid reactants to the functional imide-forming groups of said polycarboxylic acid reactants and said polyfunctional amino reactant and the functional lactam-forming groups of said ethylenically unsaturated acid reactant and said polyfunctional amino reactant should be greater than about 1.0 to 1 and less than about 3.0 to 1. A polymer having a molar ratio less than about 1.0 to 1 has less flexibility and less "cut through" than desired for a magnet wire insulation material. A polymer having a molar ratio greater than about 3.0 to 1 does not have the required thermal properties of a magnet wire insulation material as measured by NEMA "OFM" and "heat shock". Preferably, the polymer of the invention used as a magnet wire insulation material has a ratio from about 1.3 to 1 to about 2.25 to 1.

The various properties above-mentioned are determined by test procedures standardized by the Magnet Wire Section of the National Electrical Manufactures Association as published in Standards Publication No. MW1000-173, National Electrical Manufactures Association (1973).

Both the adherence of the magnet wire insulation to a substrate and the flexibility thereof are measured by a test referred to herein as "snap/snap-flex". This test is conducted in accordance with the procedure in paragraph 2.1, Standards Publication No. MW1000-173, part 3 (1973).

The thermal properties of the polymer of the invention are tested by tests referred to herein as "heat shock", NEMA "OFM", and "cut through" and "pyrolytic degradation". Each of these tests deal with a different thermal property: "heat shock" is indicative of ability of the polymer to withstand changes of temperature under stress; NEMA "OFM" is indicative of the resistance to thermal overloads of the polymer at the rated temperature; and "cut through" is indicative of the degree of plasticity of the polymer at elevated temperatures.

The test procedure for: "heat shock" is found in paragraph 4.1; NEMA "OFM" is found in paragraph 53.1; "cut through" is found in paragraph 50.1, Standards Publication No. MW1000-173, part 3 (1973). "Relative thermal stability" is determined by heating samples of the polymer in air at a given rate on a Cahn TG electrobalance system.

The electrical properties of the polymer are also tested. The "dielectric breakdown" as referred to herein is conducted by the test procedure found in paragraph 7.1, Standards Publication No. MW1000-173, part 3 (1973).

The following examples are presented herein to more fully illustrate the present invention. While specific reactions, reactants, and reaction products are described in these examples, it should be understood that each of the above generically identified reactants can be reacted in accordance with the invention disclosed herein to produce a polymer of the invention. Even within the prescribed ratios of reactants listed above, a variety of reactions and reaction products are possible; it being well within the skill of persons skilled in the art to formulate polymers of the invention in accordance therewith.

EXAMPLE I 38.5 grams of ethylene glycol, 67.0 grams of trimethyol propane, 97.0 grams of dimethyl isophthalate were placed in a reaction vessel equipped with a stirrer, a vapor trap, and heating equipment. The mass was heated to 200° C. and maintained at that temperature until 38 milliliters of distillate were removed from the trap. 100.0 grams of commercial cresylic acid, 99.0 grams of methylene dianiline, 45.0 grams of itaconic acid, and 125.0 grams of trimellitic acid anhydride were then added to the reaction vessel. The mass was carefully reheated to 220° C. The pressure in the reaction vessel was maintained at atmospheric pressure. When the temperature reached about 150° C., a conventional condensation catalyst was added to the reaction vessel. After 2 hours and 45 minutes of reaction at 220° C., the reaction solution was diluted with commercial cresylic acid and a minor portion of an aromatic hydrocarbon diluent, resulting in a reaction product comprising approximately 30% weight solids and 70% weight solvent, the solvent having a cresylic acid to diluent ratio of 60 to 40.

The resultant polymer solution was then applied to a bare copper conductor having no insulation thereon employing dies and a conventional wire coating tower at 36 feet per minute, having temperatures of 620° F., 800° F., and 850° F., respectively. Six coats were applied in this manner. The properties of the resultant magnet wire are shown in Table I.

EXAMPLE II 32.2 grams of ethylene glycol, 70.0 grams of trimethyol propane, 44.0 grams of dimethyl isophthalate were placed in a reaction vessel equipped with a stirrer, a vapor trap, and heating equipment. The mass was heated to 200° C. and maintained at that temperature until 18 milliliters of distillate were removed from the trap. 100.0 grams of commercial cresylic acid, 148.5 grams of methylene dianiline, 67.5 grams of itaconic acid, and 187.5 grams of trimellitic acid anhydride were then added to the reaction vessel. The mass was carefully reheated to 220° C. The pressure in the reaction vessel was maintained at atmospheric pressure. When the temperature reached about 150° C., a conventional condensation catalyst was added to the reaction vessel. After 3 hours and 30 minutes of reaction at 220° C., the reaction solution was diluted with commercial cresylic acid and a minor portion of an aromatic hydrocarbon diluent, resulting in a reaction product comprising approximately 38% weight solids and 70% weight solvent, the solvent having a cresylic acid to diluent ratio of 60 to 40.

The resultant polymer solution was then applied to a bare copper conductor having no insulation thereon employing dies and a conventional wire coating tower at 36 feet per minute, having temperatures of 620° F., 800° F., and 850° F., respectively. Six coats were applied in this manner. The properties of the resultant magnet wire are shown in Table I.

EXAMPLE III 50.8 grams of ethylene glycol, 87.1 grams of trimethyol propane, 145.5 grams of dimethyl isophthalate were placed in a reaction vessel equipped with a stirrer, a vapor trap, and heating equipment. The mass was heated to 200° C. and maintained at that temperature until 58 milliliters of distillate were removed from the trap. 100.0 grams of commercial cresylic acid, 99.0 grams of methylene dianiline, 45.0 grams of itaconic acid, and 125.0 grams of trimellitic acid anhydride were then added to the reaction vessel. The mass was carefully reheated to 220° C. The pressure in the reaction vessel was maintained at atmospheric pressure. When the temperature reached about 150° C., a conventional condensation catalyst was added to the reaction vessel. After 2 hours and 30 minutes of reaction at 220° C., the reaction solution was diluted with commercial cresylic acid and a minor portion of an aromatic hydrocarbon diluent, resulting in a reaction product comprising approximately 30% weight solids and 70% weight solvent, the solvent having a cresylic acid to diluent ratio of 60 to 40.

The resultant polymer solution was then applied to a bare copper conductor having no insulation thereon employing dies and a conventional wire coating tower at 36 feet per minute, having temperatures of 620° F., 800° F., and 850° F., respectively. Six coats were applied in this manner. The properties of the resultant magnet wire are shown in Table I.

EXAMPLE IV 38.5 grams of ethylene glycol, 67.0 grams of trimethyol propane, 97.0 grams of dimethyl isophthalate were placed in a reaction vessel equipped with a stirrer, a vapor trap, and heating equipment. The mass was heated to 200° C. and maintained at that temperature until 38 milliliters of distillate were removed from the trap. 100.0 grams of commercial cresylic acid, 99.0 grams of methylene dianiline, 77.0 grams of itaconic acid, and 77.0 grams of trimellitic acid anhydride were then added to the reaction vessel. The mass was carefully reheated to 220° C. The pressure in the reaction vessel was maintained at atmospheric pressure. When the temperature reached about 150° C., a conventional condensation catalyst was added to the reaction vessel. After 3 hours and 30 minutes of reaction at 220° C., the reaction solution was diluted with commercial cresylic acid and a minor portion of an aromatic hydrocarbon dilutent, resulting in a reaction product comprising approximately 30% weight solids and 70% weight solvent, the solvent having a cresylic acid to diluent ratio of 60 to 40.

The resultant polymer solution was then applied to a bare copper conductor having no insulation thereon employing dies and a conventional wire coating tower at 36 feet per minute, having temperatures of 620° F., 800° F., and 850° F., respectively. Six coats were applied in this manner. The properties of the resultant magnet wire are shown in Table I.

EXAMPLE V 38.5 grams of ethylene glycol, 67.0 grams of trimethyol propane, 97.0 grams of dimethyl isophthalate were placed in a reaction vessel equipped with a stirrer, a vapor trap, and heating equipment. The mass was heated to 200° C. and maintained at that temperature until 38 milliliters of distillate were removed from the trap. 100.0 grams of commercial cresylic acid, 99.0 grams of methylene dianiline, 35.0 grams of itaconic acid, and 140.0 grams of trimellitic acid anhydride were then added to the reaction vessel. The mass was carefully reheated to 220° C. The pressure in the reaction vessel was maintained at atmospheric pressure. When the temperature reached about 150° C., a conventional condensation catalyst was added to the reaction vessel. After 3 hours and 30 minutes of reaction at 220° C., the reaction solution was diluted with commercial cresylic acid and a minor portion of an aromatic hydrocarbon dilutent, resulting in a reaction product comprising approximately 30% weight solids and 70% weight solvent, the solvent having a cresylic acid to diluent ratio of 60 to 40.

The resultant polymer solution was then applied to a bare copper conductor having no insulation thereon employing dies and a conventional wire coating tower at 36 feet per minute, having temperatures of 620° F., 800° F., and 850° F., respectively. Six coats were applied in this manner. The properties of the resultant magnet wire are shown in Table I.

Table I shows the physical, mechanical, chemical, and electrical properties of the polymers of the invention made in accordance with the Examples hereinabove, applied to a bare 18AWG copper conductor having no insulation thereon and tested in accordance with the above-identified test procedures approved by the National Electrical Manufactures Association. The properties of the polymer of the invention are indicated in Table I together with the properties of a prior art insulation material made in accordance with the teaching of U.S. Pat. No. 3,793,250 referenced hereinabove. This prior art insulation material was made in accordance with the following procedure:

EXAMPLE VI 46.0 grams of ethylene glycol, 79.0 grams of trimethylol propane, 198.0 grams of methylene dianiline, 250.0 grams of trimelletic anhydride, 90.0 grams of itaconic acid, and 145.0 grams of commercial cresylic acid were placed in a reaction vessel equipped with a stirrer, a vapor trap, and heating equipment. The mass was heated carefully to 150° C. At this temperature, a yellow precipitate formed. 7.0 grams of a 10% solution of tetrabutyl-titanate in commercial cresylic acid was added and the mass was further heated to 220° C. until 67 milliliters of distillite was removed. Then, 341.0 grams of commercial cresylic acid and 65.0 grams of a 10% solution of a tetrabutyl titanate were added to the mass and the mass was held at 140° C. for about 1 hour. The resulting polymer was diluted with commercial cresylic acid and an aromatic hydrocarbon diluent to a final solution consisting of 30% weight solids and 70% weight solvent, the solvent having a solvent to diluent ratio of 60 to 40.

The polymer was then applied to a bare copper conductor having no insulation thereon employing dies and a conventional wire coating tower at 36 feet per minute having back temperatures of 620° F., 800° F., and 850° F., respectively. Six coats were applied in this manner.

Polymers made in accordance with Examples I hereinabove were tested in accordance with the "relative thermal stability" test procedure above-referred to. These data on an THEIC modified polyester polymer, THEIC modified polyamide-imide-ester polymer, an amide-imide and an isocyanate modified polyethylene terephthalate polymer are all shown in FIG. 1. These data show that the polymer of the invention made in accordance with the Examples compares favorably with the polyester-imide polymer made in accordance with Example VI, even though the polymer of the invention is considerably less expensive than the polymer of Example VI.

Similarly, with reference to Table I, it is shown that each of the polymers made in accordance with the invention compare favorably with the polyester-imide of U.S. Pat. No. 3,793,250. In fact, the polymers of the invention have by and large superior thermal properties and "burn out" resistance as indicated by NEMA "OFM" and improved resistance to thermal stress and overloads.

The polymers of the invention further have a high surface hardness and can be applied in a rapid manner, at a lower cost than, but otherwise completely comparable to conventional wire enamels comprising polymers having a plurality of ester, amide, imide groups therein.

Thus, by the invention, an improved polymer has been provided. The polymer of the invention has a higher and more reliable thermal life, an increased resistance to thermal overloads, and at the same time all of the required mechanical, physical, chemical and electrical properties required for most of the uses as insulation material. Additionally, the improved polymer can be applied to substrates using conventional machinery in a rapid manner and is less costly than comparable prior art insulation materials. The improved polymer has a plurality of amide, imide and ester groups therein in an unique balance by which the thermal properties are enhanced, the flexibility of the polymer is not deleterously affected, and none of the physical, mechanical, electrical or chemical properties of conventional polyester, polyamide, polyamide or polyimide materials are detracted from. Further, the improved polymer of the invention is soluble in conventional cresylic acid and can be applied from solutions thereof. The improved method of the invention provides an improved method of making the polymer of the invention.

While there have been described above the principles of this invention in connection with specific chemistry, it is to be clearly understood that this description is made only by way of example and not as a limitation to the scope of the invention.

naphthalene tetracarboxylic; benzophenone 2,3,2',3' tetracarboxylic; and 3,3',4,4' diphenyl tetracarboxylic acids, the anhydrides of said acids and combinations thereof.

4. The resin of claim 1 wherein said ethylenically unsaturated reactant is chosen from the group consisting of itaconic or aconitic acid and combinations thereof.

5. The resin of claim 1 wherein said polyfunctional hydroxyl compound is chosen from the group consisting of ethylene glycol, glycerin, pentaerythrytol, 1,1,1 trimethylol ethane, 1,1,1 trimethylol propane, zorbitol, manitol, dipentaerythritol, and $\alpha, \omega$ aliphatic hydrocarbon diols having four to five carbon atoms; hydroquinone dibetahydroxy ethyl ether; 1,4 cyclohexane dimethylol; polyethylene glycol; polytetramethylene oxide glycol and combination thereof.

6. The resin of claim 1 wherein said molar ratio of said hydroxyl groups to said ester-forming groups is from about 1.3 to 1 to about 1.6 to 1.

TABLE I

Properties of Polymers of Example I through VI Applied to a 18 AWG Bare Copper Conductor

| Example | 1 | 2 | 3 | 4 | 5 | 6 |
|---|---|---|---|---|---|---|
| Surface Rating | 1.6 | 1.1 | 1.1 | 1.1 | 1.1 | 1.6 |
| Build | 3.0–3.4 | 3.2–3.4 | 3.0–3.1 | 2.9–3.2 | 3.2–3.4 | 3.3–3.4 |
| Mandrel Flex | OK-BP | OK-BP | OK-BP | OK-BP | OK-BP | OK-BP |
| Snap/Snap-Flex | OK-OK 1X | OK-OK 1X | OK-OK 1X | OK-OK 1X | OK-OK 1X | OK-OK 1X |
| Heat Shock | Pass 200° C | Pass 200° C | Pass 175° C | Pass 175° C | Pass 200° C | Pass 200° C |
| Techrand OFM | 12.08 | 11.67 | 11.99 | 11.38 | 12.22 | 9.17 |
| NEMA Cut-Thru (° C) | 290° C | 267 | 290 | 267 | 255 | 289° C |
| Dielectric Breakdown | 12,967 V | 14,300 V | 12,933 V | 11,733 V | 12,100 V | 10,733 V |

What is claimed is:

1. An essentially linear resin having a plurality of amide, imide and ester groups therein and the physical mechanical, chemical and electrical properties of a magnet wire insulation material comprising the condensation product of at least one polycarboxylic acid five member ring forming reactant, at least one ethylenically unsaturated polycarboxylic acid five or six member lactam ring forming reactant, at least one polyfunctional amino five or six member ring forming reactant, at least one glycol, at least one other polyfunctional hydroxyl compound, at least one carboxylic acid ester reactant chosen from the group consisting of the acids, esters, anhydrides, and akylesters of terephthalic, isophthalic and benzophenone dicarboxylic acids, the molar ratio of the functional hydroxyl groups of said glycol and hydroxyl compound to the functional ester-forming carboxyl groups of said acid reactants being greater than about 1.3 to 1, the molar ratio of the functional imide-forming groups of said polycarboxylic acid five member ring forming reactant and said polyfunctional amino reactants to the functional lactam-forming groups of said ethylenically unsaturated acid and polyfunctional amino reactants being greater than about 0.5 to 1 and less than about 3.0 to 1, the molar ratio of said ester-forming groups to said functional imide-forming and lactam-forming groups being greater than about 1.0 to 1 and less than about 3.0 to 1.

2. The resin of claim 1 wherein said polycarboxylic acid five member ring forming reactant is chosen from the group consisting of tricarboxylic and tetracarboxylic acids, the anhydrides thereof, and combinations of the same.

3. The resin of claim 1 wherein said polycarboxylic acid five member ring forming reactant is chosen from the group consisting of trimellitic; pyromellitic; 2,3,6,7

7. The resin of claim 1 wherein said molar ratio of said imide-forming to lactam-forming groups is from about 1.0 to 1 to about 2.5 to 1.

8. The resin of claim 1 wherein said molar ratio of said ester-forming groups to said imide-forming and lactam-forming groups is from about 1.3 to 1 to about 2.5 to 1.

9. The resin of claim 8 wherein said molar ratio of said hydroxyl groups to said ester-forming groups is from about 1.34 to 1 to about 1.40 to 1.

10. The resin of claim 9 wherein said molar ratio of said imide-forming groups to lactam-forming groups is about 2 to 1, and said molar ratio of said ester-forming groups to said imide and lactam-forming groups is about 2 to 1.

11. The resin of claim 10 comprising essentially of the condensation product of trimellitic acid anhydride, itaconic acid, methylene dianiline, ethylene glycol, 1,1,1-trimethylol propane and dimethyl isophthalate.

12. A method of forming a polymer having reocurring amide, imide and ester groups therein comprising the steps of placing in a solvent for said polymer, at least one glycol, at least one polyfunctional hydroxyl compound, at least one carboxylic acid ester forming reactant chosen from the groups consisting of the acids, esters, anhydrides, and alkylesters of terephthalic, isophthalic and benzophenone dicarboxylic acids, reacting said glycol and hydroxyl compound and carboxylic acid ester forming reactant, thereby forming a solution of a reaction product, placing in said solution said reaction product, at least one polycarboxylic acid five member ring forming reactant, at least one ethylenically unsaturated polycarboxylic acid five or six member lactam ring forming reactant, at least one polyfunctional amino five or six member ring forming reactant, the molar ratio of the functional hydroxyl groups of said glycol and hydroxyl compound to the functional ester-forming carboxyl groups of said acid reactants being greater than about 1.3 to 1, the molar ratio of the functional imide-forming groups of said polycarboxylic acid five member ring forming reactant and said polyfunctional amino reactant to the functional lactam-forming groups of said ethylenically unsaturated acid and polyfunctional amino reactants being greater than about 0.5 to 1 and less than about 3.0 to 1, the molar ratio of said functional ester-forming groups to said functional imide-forming and lactam-forming groups being greater than about 1.0 to 1 and less than about 3.0 to 1, thereby forming a reaction mixture, reacting said mixture in the presence of a condensation catalyst.

13. The method of claim 12 wherein said ratio of said ester-forming groups to said imide-forming and lactam-forming groups is from about 1.3 to 1 to about 2.5 to 1, said ratio of said hydroxyl groups to said ester-forming groups is from about 1.34 to 1 to about 1.40 to 1, and said ratio of said imide-forming groups to lactam-forming groups is about 2 to 1.

14. The resin of claim 5, wherein said aliphatic hydrocarbon diols having four to five carbon atoms are chosen from the group consisting of 1,4 butane diol; 1,5 pentane glycol; neopentylene glycol; (1,4-butene-2-diol) propylene glycol; and wherein said cyclic glycols are chosen from the group consisting of 2,2,4,4 tetramethyl 1,3 cyclobutane diol and tris(2hydroxy ethyl) isocyanurate and combinations thereof.

15. The method of claim 12 wherein both of said reacting steps are accomplished at atmospheric pressure and a temperature from about 120° to about 220° C.

* * * * *

UNITED STATES PATENT OFFICE
CERTIFICATE OF CORRECTION

Patent No. 4,141,886        Dated February 27, 1979

Inventor(s) George H. Sollner, Keith D. Bultemeier, Richard D. Remaks

It is certified that error appears in the above-identified patent and that said Letters Patent are hereby corrected as shown below:

Column 10, Line 36 between "with" and "I" change "Examples" to "Example".

Column 11, Line 10 between "polyamide" and "or", omit the second "polyamide".

Column 12, Line 14 between "atoms;" and "hydroquinone" insert the words "cyclic glycols;".

Signed and Sealed this

Eleventh Day of November 1980

[SEAL]

Attest:

SIDNEY A. DIAMOND

Attesting Officer     Commissioner of Patents and Trademarks